United States Patent
Shah et al.

(10) Patent No.: US 12,513,599 B2
(45) Date of Patent: Dec. 30, 2025

(54) SYSTEM AND METHODS FOR GEOGRAPHIC AND TIME-BASED CONTROL OF SATELLITE NETWORK CONNECTIONS TO USER DEVICES

(71) Applicant: T-MOBILE INNOVATIONS LLC, Overland Park, KS (US)

(72) Inventors: Mehul Jayant Shah, Sammamish, WA (US); Suresh Thanneeru, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 397 days.

(21) Appl. No.: 18/328,477

(22) Filed: Jun. 2, 2023

(65) Prior Publication Data

US 2024/0406842 A1    Dec. 5, 2024

(51) Int. Cl.
*H04W 48/04*        (2009.01)
*H04W 4/021*        (2018.01)
*H04W 8/22*         (2009.01)
*H04W 84/06*        (2009.01)

(52) U.S. Cl.
CPC ........... *H04W 48/04* (2013.01); *H04W 4/021* (2013.01); *H04W 8/22* (2013.01); *H04W 84/06* (2013.01)

(58) Field of Classification Search
CPC ....... H04W 48/04; H04W 4/021; H04W 8/22; H04W 84/06
USPC ...................................... 455/456.3
See application file for complete search history.

(56) References Cited

U.S. PATENT DOCUMENTS

2017/0134905 A1*  5/2017  Venkatesan ......... H04W 12/069
2020/0400773 A1* 12/2020  Li .......................... G01S 5/0295

* cited by examiner

*Primary Examiner* — Chuck Huynh
(74) *Attorney, Agent, or Firm* — SHOOK, HARDY & BACON L.L.P.; Elena McFarland

(57) ABSTRACT

Aspects herein provide systems, methods, and media for terrestrially controlling whether user devices are allowed to or preventing from accessing and utilizing a non-terrestrial network. Using geofencing and time-based threshold techniques, a terrestrial network component determines and control whether user devices within a geofence should be prevented from accessing and utilizing the non-terrestrial network in order to avoid overloading the capacity of the non-terrestrial network. The terrestrial network component sends an indication and/or error to the non-terrestrial network for delivery to the user device to prevent the access. When the user device receives the indication and/or error from a satellite, for example, the user device that is within the geofence is caused to access and utilize the terrestrial network instead of the non-terrestrial network.

20 Claims, 5 Drawing Sheets

SYSTEM AND METHODS FOR GEOGRAPHIC AND TIME-BASED CONTROL OF SATELLITE NETWORK CONNECTIONS TO USER DEVICES

TECHNICAL BACKGROUND

The present disclosure generally relates to controlling user device connections with satellite-based network and terrestrial telecommunications network.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In one aspect, a computerized method is provided. In accordance with a method, an indication that a user device sent a request to access a satellite network is received, wherein the indication is associated with a unique identifier for the user device, location coordinates of the user device, and a timestamp. It is determined whether the user device is located within a predefined geofence based on the location coordinates of the user device. Based on determining that the user device is located within the predefined geofence, a database is queried with the unique identifier for the user device to determine whether the unique identifier is associated with one or more previously captured events on a terrestrial network within the predefined geofence, wherein the one or more previously captured events are associated with corresponding timestamps. When the unique identifier is determined to be associated with the one or more previously captured events, one of the one or more previously captured events is identified that is associated with a most recent timestamp relative to any other previously captured events that are associated with the unique identifier. A total time duration is determined, as measured between the most recent timestamp and the timestamp of the indication. When the total time duration measured between the most recent timestamp and the timestamp of the indication is less than or equal to a predefined threshold, it is determined that the request to access the satellite network from the user device should be rejected. An error is generated and communicated to the satellite network, wherein the error causes the satellite network to reject the request from the user device to access the satellite network.

In another aspect, one or more non-transitory computer-readable media are provided for storing instructions that when executed via one or more processors perform a computerized method. In accordance with the media, an indication that a user device sent a request to access a satellite network is received, wherein the indication is associated with a unique identifier for the user device, location coordinates of the user device, and a timestamp. It is determined whether the user device is located within a predefined geofence based on the location coordinates of the user device. Based on determining that the user device is located within the predefined geofence, a database is queried with the unique identifier for the user device to determine whether the unique identifier is associated with one or more previously captured events on a terrestrial network within the predefined geofence, wherein the one or more previously captured events are associated with corresponding timestamps. When the unique identifier is determined to be associated with the one or more previously captured events, one of the one or more previously captured events is identified that is associated with a most recent timestamp relative to any other previously captured events that are associated with the unique identifier. A total time duration is determined, as measured between the most recent timestamp and the timestamp of the indication. When the total time duration measured between the most recent timestamp and the timestamp of the indication is less than or equal to a predefined threshold, it is determined that the request to access the satellite network from the user device should be rejected. An error is generated and communicated to the satellite network, wherein the error causes the satellite network to reject the request from the user device to access the satellite network.

In yet another aspect, a system is provided. The system comprises a database storing and updating events for a plurality of user devices, wherein each event corresponds to a unique identifier that is specific to a particular device, wherein each event is associated with a user device location for the particular user device, wherein each event is associated with a timestamp. The system further comprises a server having one or more processors, wherein the server operates within a telecommunications network, wherein the server is communicatively coupled to a base station within the telecommunications network. The one or more processors receive an indication that a user device sent a request to access a satellite network, wherein the indication is associated with a unique identifier for the user device, location coordinates of the user device, and a timestamp. The user device is determined to be located within a predefined geofence based on the location coordinates of the user device. Based on determining that the user device is located within the predefined geofence, the database is queried with the unique identifier for the user device to determine whether the unique identifier is associated with one or more previously captured events on a terrestrial network within the predefined geofence, wherein the one or more previously captured events are associated with corresponding timestamps. When the unique identifier is determined to be associated with the one or more previously captured events, one of the one or more previously captured events is identified that is associated with a most recent timestamp relative to any other previously captured events that are associated with the unique identifier. A total time duration is determined that is measured between the most recent timestamp and the timestamp of the indication. When the total time duration measured between the most recent timestamp and the timestamp of the indication is less than or equal to a predefined threshold, it is determined that the request to access the satellite network from the user device should be rejected. An error is generated and communicated an error to the satellite network, wherein the error causes the satellite network to reject the request from the user device to access the satellite network.

BRIEF DESCRIPTION OF THE DRAWINGS

Aspects are described in detail below with reference to the attached drawings figures, wherein.

DETAILED DESCRIPTION

Figure 1:
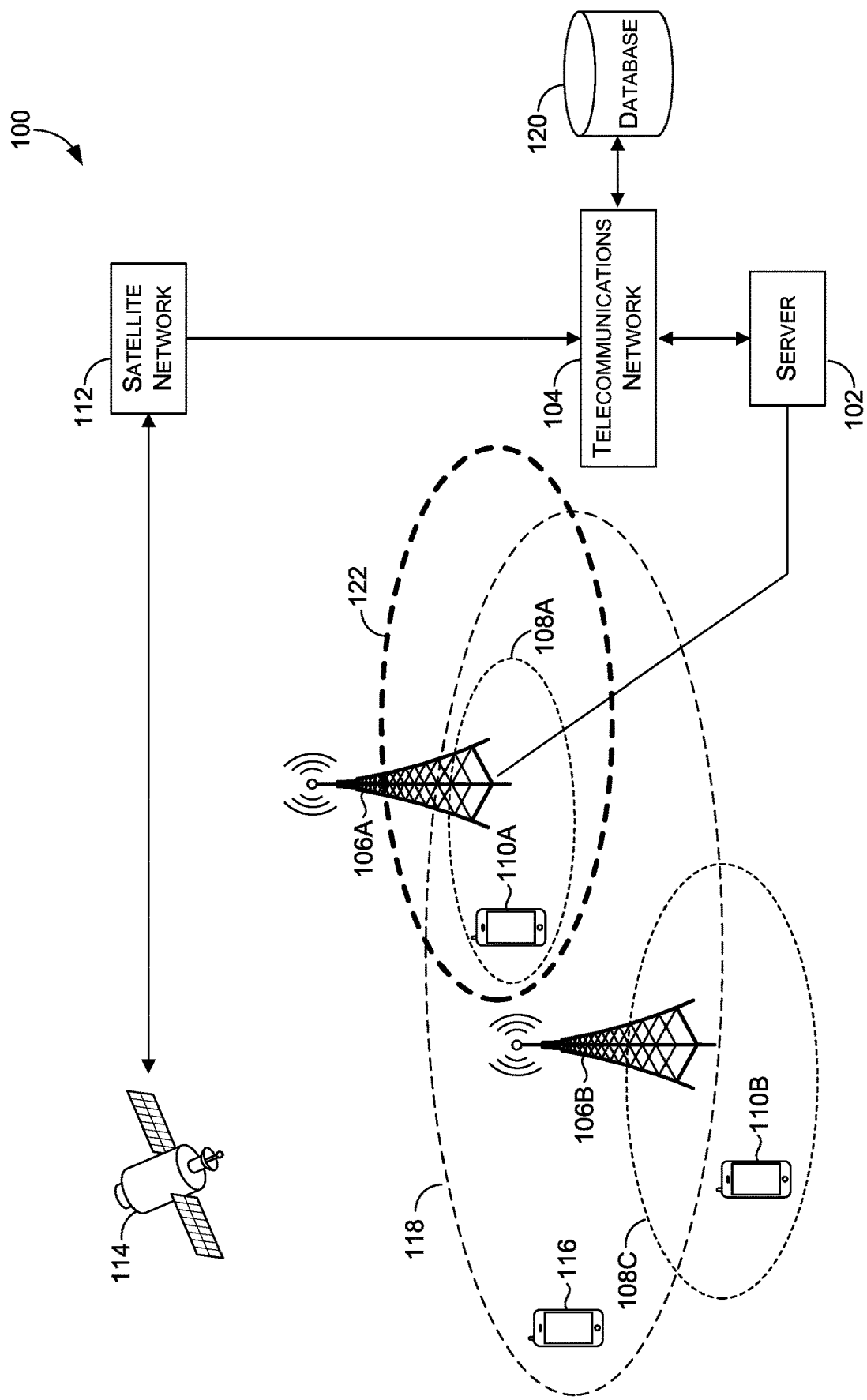
FIG. 1 depicts an example system environment, in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G/5G NR Fifth-Generation Wireless Access Technology/New Radio
5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IoT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device and system shown in FIGS. 4 and 5 respectively. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Physical resource block" (PRB) is used to refer to a defined quantity of consecutive subcarriers in a frequency domain that is used for wireless transmission and wireless reception of waveform signals via antennas/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIOT, NB-IoT, and similar technologies without limitation. For this reason, physical resource blocks are discussed herein in a network-agnostic manner, as the aspects discussed herein can be implemented within each of the different technology environments.

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Satellite-based networks generally have a limited capacity available for handling additional data connectivity. For example, due to the limited capacity, the connection of multiple terrestrial user devices to the satellite-based network can quickly overwhelm and overload the capacity of the satellite-based network. When overloaded, one or more user devices that lack any terrestrial telecommunications network coverage, for example, are unable to connect to the satellite-based network due to the capacity being "clogged" by the satellite-based connections of the user devices that, for example, are connected to the satellite-based network despite having terrestrial telecommunications network coverage. Aspects herein provide a technological solution to manage connections between user devices and satellite-based networks using geofencing and time-based thresholding techniques, by leveraging the terrestrial telecommunications network resources and components.

FIG. 1 depicts an example of a network environment 100, in accordance with one or more embodiments. The network environment 100 includes a server 102 having one or more processors. The server 102 operates within and thus is communicatively coupled to a telecommunications network 104 or its components. In various aspects, the server 102 may be a Home Subscriber Server (HSS), a Diameter Routing Agent (DRA), possibly a component operating between an HSS and DRA, or may be operated in a distributed manner using both the HSS and DRA. The server 102 is communicatively coupled to one or more base stations 106A and 106B within the telecommunications network 104. Each of the one or more base stations 106A and 106B has a corresponding coverage area 108A and 108B. The one or more base stations 106A and 106B can provide telecommunications services to one or more user devices 110A and 110B.

The telecommunications network 104 is communicatively coupled to a database 120, which the telecommunications network 104 maintains and updates periodically, intermittently, and/or in near real-time. The database 120 stores data for a plurality of events that have been captured within the telecommunications network 104 for a plurality of user devices. Each event corresponds to a unique identifier that is specific to a particular device, for example, the unique identifier identifies the particular user and/or identifies a particular device for which the event occurred, in aspects. Each event is associated with a user device location for the particular user device, for example, the longitude and latitude coordinates where the user device was physically located when the event occurred. Each event is associated with a timestamp, for example, the date and time (e.g., hours, minutes, and seconds) when the event occurred at the user device and/or when the event was captured by the telecommunications network 104. In various aspects, the database 120 stores a plurality of events for a plurality of user devices, where each corresponds to a unique identifier that is specific to a particular device, where each event is associated with a user device location for the particular user device, where each event is associated with a timestamp, or any combination thereof. The database 120 can be queried as further discussed hereinafter using a unique identifier to identify and located one or more events or a set of events that are specifically associated with a particular user and/or a particular user device. For simplicity, the aspects here refer to the unique identifier as corresponding to a particular user device, but it will be understood that other unique identifiers for identifying a particular user or account are contemplated and considered within the scope of this discussion.

In the network environment 100 shown, the telecommunications network 104 interfaces with a non-terrestrial network (NTN), such has satellite network 112, which can also be referred to as an aerospace network. In one aspect, the server 102 operates as, or is communicatively coupled to, a telecommunications core network component (not shown) that acts as an interface between the satellite network 112 and the telecommunications network 104. The satellite network 112 can include one or more devices configured to act as aerospace access points, such as satellite 114. Although not shown, the satellite network 112 may interface with and communicate with one or more terrestrial radio elements that are not associated with the telecommunications network 104. The user device 116 may be concurrently located within the coverage area 118 of the satellite 114 and a coverage area 108A of the base station 106A in the telecommunications network 104. In addition to having concurrent coverage via the satellite 114 and the telecommunications network 104, the user device 116 may be physically located within a geofence area, such as geofence 122.

A geofence is an electronic representation of a geographic area, where that electronic representation defines an area and boundaries of the area using location data such as coordinates (e.g., longitude and latitude). The area bounded by a geofence could correspond to: an area with a high population density or high network traffic of any scale, such as a city or metropolitan area (e.g., Seattle, Kansas City Metropolitan area, a hospital campus); portions of such areas (e.g., downtown Seattle). The geofence and its boundaries can be customized and configured for a specific area using information such as historical and/or recent terrestrial network traffic for the area, historical and/or recent terrestrial network loading data for the area, existing cell site coverage for a terrestrial network for the area, planned or future cell site coverage to be added to a terrestrial network for the area, historical and/or recent terrestrial network data for another area having similar characteristics, or the like, in various aspects.

The user device 110A is located within the coverage area 118 of the satellite and is concurrently located within the coverage areas 108A of the base station 106A. For this reason, the user device 110A could request access to the satellite network 112 through the satellite 114 and could also request access to the telecommunications network 104 through the base station 106A. In contrast, the user device 110B is located outside of the coverage area 118 of the satellite but is located within the coverage areas 108B of the base stations 106B. For this reason, the user device 110B would not communicate with the satellite 114 and cannot successfully request access to the satellite network 112 via the satellite 114. Instead, the user device 110B would connect to the telecommunications network 104.

Figure 2:
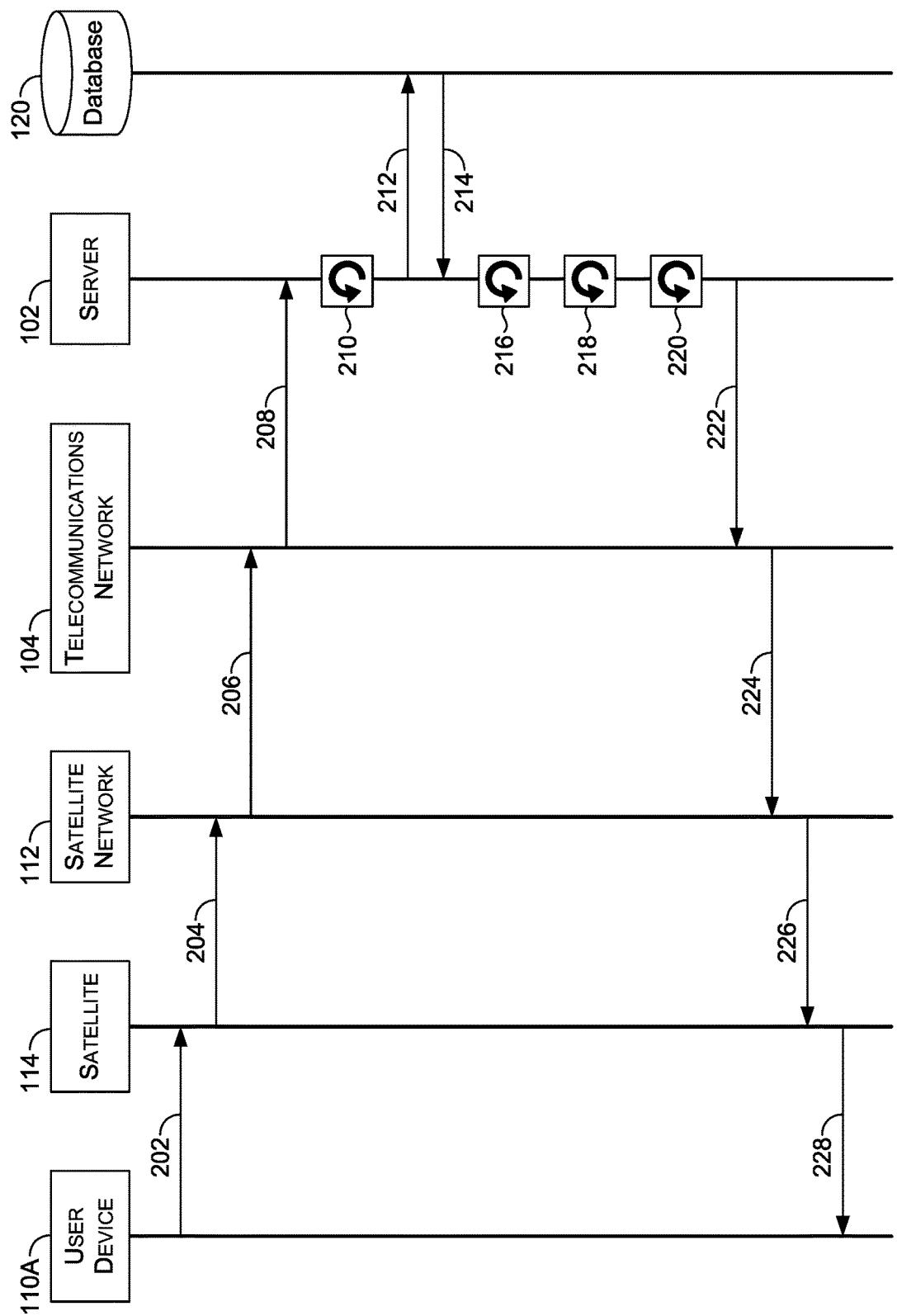
FIG. 2 depicts a diagram of communications involving system environment of FIG. 1, in accordance with one or more embodiments.

Looking to the diagram of FIG. 2, the user device 110A communicates 202 with a satellite 114, for example, by sending a request to access the satellite network 112. For example, the user device 110A may roam onto the satellite network 112 through the satellite 114. In response to the roaming of the user device 110A onto the satellite network 112, the satellite communicates 204 the request itself and/or an indication of the request over the satellite network 112.

The satellite network 112 then communicates 206 or relays the request itself and/or an indication of the request to the telecommunications network 104, using a satellite-to-earth gateway and/or interface component (not shown). The request and/or the indication of the request, which originated in the satellite network 112, is encoded using protocols for the satellite network 112.

The telecommunications network 104 communicates 208 or relays the request itself and/or an indication of the request to the server 102. The server 102 is able to recognize that the user device 110A sent a request to access a satellite network 112, for example, when the indication is associated with a particular signaling protocol (e.g., diameter signaling protocol) and/or that includes an indication (e.g., a PLMN code) within the signaling protocol that specifies the request originated via the satellite network 112. The signaling protocol may be specific to the satellite network 112, the telecommunications network 104, or both, in various embodiments. In other words, the server 102 is programmed to identify information in the request and/or the indication which indicate the data is encoded using protocols for the satellite network 112, where such protocols and encoding are distinguishable from the encoding and protocols utilized by the telecommunications network 104. In some aspects, the indication may include a satellite and/or satellite network-specific marker, tag, data format, and/or identifier. As such, the server 102 can recognize that it has received an indication that the user device sent a request to access the satellite network 112. For simplicity, an "indication" is referred thereinafter for brevity and simplicity, though the original request or other indication that may be generated by the satellite 114 upon receiving the original request from the user device 110A are contemplated and are within the scope of this discussion. The indication can be associated with a unique identifier for the user device, a location (e.g., location coordinates) of the user device, a timestamp, or any combination thereof.

Using the location coordinates of the user device 110A, the server 102 determines 210 whether the user device 110A is located within a predefined geofence. For example, using the location coordinates of the user device, the server 102 can determine that the user device 110A is located within one or more specific predefined geofences. In other aspects, the server 102 may identify and select one or more particular predefined geofences from a plurality of predefined geofences that have been defined for the telecommunications network 104, that particular predefined geofences being selected based on their having a particular geographic proximity (e.g., within a specific distance radius or geographic region) to the location coordinates of the user device, relative to the proximities of other predefined geofences. In such an aspect, the server 102 may then perform a further comparison of the location coordinates of the user device to the particular geographic proximity to determine whether the user device 110A is located within a predefined geofence. As shown in FIG. 1, for example, when the user device 116 located within the coverage area 118 of the satellite sends a request to access the satellite network 112, the server 102 would determine the user device 116 is located outside of the geofence 122 based on the location of the user device 116 in the indication. However, when the user device 110A located within the coverage area 118 of the satellite sends a request to access the satellite network 112, the server 102 would determine the user device 116 is located within of the geofence 122 based on the location of the user device 110A in the indication. Although the location of a user device is discussed herein with regard to longitude and latitude coordinates, other location-defining data associated with a user device is contemplated and could be used alternatively, and as such, other location-defining data is considered to be within the scope of this discussion.

Based on the server 102 determining that the user device 110A is located within a predefined geofence, the server 102 queries 212 the database 120 using the unique identifier for the user device from the indication. The server 102 uses the unique identifier to search the database 120 for any previously captured events on the telecommunications network 104, in aspects. The previously captured events in the database 120 that correspond to the unique identifier are returned 214 as search results to the server 102. In further aspects, the previously captured events could include location data in the database 120, such that the server 102 can further return only those previously captured events that occurred while the user device was located within the predefined geofence at issue (e.g., based on location data stored in association with the one or more events). Alternatively, the server 102 uses the unique identifier to search the database 120 for any previously captured events on the telecommunications network 104, independent of location data relative and/or independent of any geofence. Examples of events that can be captured and stored in the database 120 generally refer to registration and mobility events such as: a user device registering on the telecommunication network; a user device registering with a particular cell site on the telecommunication network; an attach complete; a location area update; a tracking area update; or any combination thereof. As discussed above, each event is associated with a timestamp, for example, the date and time (e.g., hours, minutes, and seconds) when the event occurred at the user device and/or when the event was captured by the telecommunications network 104.

In some instances, the unique identifier may not be associated with any previously captured events stored in the database 120. In such an example, the server 102 might receive a null result or an indication of 'no events found' from the query. Based on this outcome, the server 102 could determine that the request to access the satellite network 112 sent from the user device 116 should be allowed.

In other instances, the unique identifier is determined to be associated with one or more previously captured events stored in the database 120. When the unique identifier is determined to be associated with the one or more previously captured events, the server 102 identifies 216 one of the one or more previously captured events that is associated with a most recent timestamp relative to any other previously captured events that are associated with the unique identifier.

Using the timestamp that is the most recent (e.g., relative to the current date and time) for the one event identified, the server 102 determines 218, identifies, and/or calculates the total time duration as measured between the most recent timestamp and the timestamp of the indication. The server further determines 220 whether the total time duration is less than, meets, or exceeds a predefined threshold. The predefined threshold defined a configurable time duration. In some aspects, the predefined threshold is configured to be specific to the particular geofence, to a particular service issue (e.g., scheduled service outages on the telecommunications network 104; disaster recovery areas), a device type that is the same as the user device (e.g., based on device type identification using the IMEI of the user device 110A), a service tier for an account that corresponds to the user device 110A, and/or any combination thereof. In various examples, the predefined threshold can be a time duration of about one to about 15 seconds, or even up to about two or about three minutes.

When the total time duration is greater than the predefined threshold, the server 102 determines that the request to access the satellite network 112 from the user device 110A should be accepted, or at least, not rejected and/or prevented at that time. In such an instance, no further actions by the server 102 are needed, albeit the outcome of this determination can optionally be stored as an event in the database 120, in association with the unique identifier of the user device 110A. In other instances, further action can be undertaken. For example, when the total time duration measured between the most recent timestamp and the timestamp of the indication is greater than the predefined threshold, the server 102 can generate and communicate a notification to the satellite network 112, wherein the notification causes the satellite network 112 to allow the request from the user device 110A to access the satellite network 112.

When the total time duration measured between the most recent timestamp and the timestamp of the indication is determined to be less than or equal to a predefined threshold, the server 102 determines that the request from the user device 110A to access the satellite network 112 should be rejected. Further, a notification and/or error is generated and communicated 222 from the server 102 to the telecommunication network, then relayed 224 to the satellite network 112. The notification could specify a specific error and/or an established error code that is usable and recognized by the satellite network 112, such as, for example, error codes specific to a forbidden element list, a 'no suitable cells' message, and/or roaming prevention. The notification and/or error causes the satellite network 112 to reject 226 the request from the user device 110A to access the satellite network 112, and the rejection is communicated 228 to the satellite 114 for communicating 228 to the user device 110A. As the request has not been allowed and/or has been rejected, the user device 110A located within the geofence 122 will preferentially request to join the telecommunications network 104 in an effort to obtain communication services.

Using the geofence and the predefined time-based thresholds discussed above to determine when to allow a user device to connect to and access a satellite network via a satellite, and when to prevent such a connection, ensures that the limited capacity available on the satellite network is protected. This avoids overloading the satellite network 112 with unnecessary user device connections and subsequent data transmissions from those user devices within the geofence 122. Additionally, preventing user devices that are located within the geofence 122 and that have access to the telecommunications network 104 from connecting and utilizing the satellite network 112 ensures that other user devices that are located outside of the geofence have access to the satellite network 112, as well as other user device that are located within the geofence but which cannot access the telecommunications network 104, for example. Thus, user devices within the geofence that have telecommunication network coverage are deprioritized to ensure that other devices lacking telecommunication network coverage can access the satellite network 112 instead.

Having described the network environment 100 and components thereof, it will be understood by those of ordinary skill in the art that network environment 100 is but one example of a suitable system and is not intended to limit the scope of use or functionality of the present invention. Similarly, network environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 3:
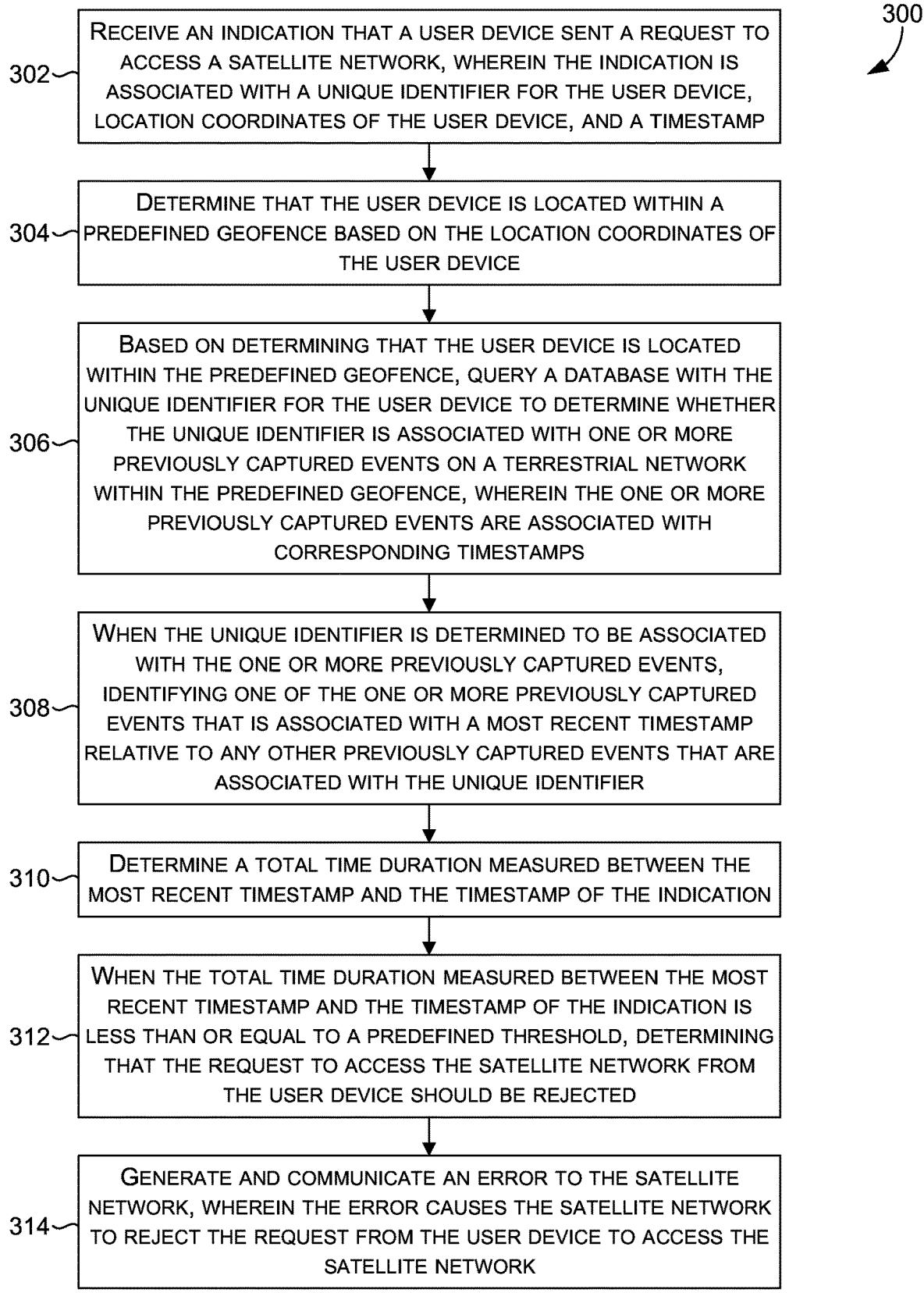
FIG. 3 depicts an example method, in accordance with one or more embodiments.

FIG. 3 depicts an example method 300, in accordance with one or more embodiments. In various aspects, the method 300 can be a computer-implemented method and/or one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, can specify a sequence of steps of the method 300, and/or can identify particular component(s) of software and/or hardware for performing one or more of the steps of the method 300, in embodiments. The method 300 can be performed using software, hardware, component(s), and/or device(s) depicted in the examples of FIGS. 1 and/or 2. For example, one or more steps of the method 300 can be performed by the server 102.

At block 302, an indication that a user device sent a request to access a satellite network is received, wherein the indication is associated with a unique identifier for the user device, location coordinates of the user device, and a timestamp. It is contemplated that, where the indication indicates that the request to access the satellite network is associated with a distress indicator (e.g., a 911 call, SOS signal, or other emergency communication), the user action is allowed or enabled to the access the satellite network and further actions discussed herein are bypassed (e.g., no further actions are undertaken to assess the indication for the purpose of preventing the user device from accessing the satellite network), independent of the geofence and/or the threshold.

Continuing, at block 304, it is determined that the user device is located within a predefined geofence based on the location coordinates of the user device. Based on determining that the user device is located within the predefined geofence, a database is queried with the unique identifier for the user device to determine whether the unique identifier is associated with one or more previously captured events on a terrestrial network within the predefined geofence, wherein the one or more previously captured events are associated with corresponding timestamps, shown at block 306. When the unique identifier is determined to be associated with the one or more previously captured events, one of the one or more previously captured events is identified that is associated with a most recent timestamp, determined relative to timestamps of any other previously captured events that are also associated with the unique identifier, s shown at block 308. At block 310, a total time duration is determined as measured between the most recent timestamp and the timestamp of the indication. At block 312, when the total time duration measured between the most recent timestamp and the timestamp of the indication is less than or equal to a predefined threshold, it is determined that the request to access the satellite network from the user device should be rejected. Further, an error can then be generated and communicated 314 to the satellite network, wherein the error causes the satellite network to reject the request from the user device to access the satellite network.

Figure 4:
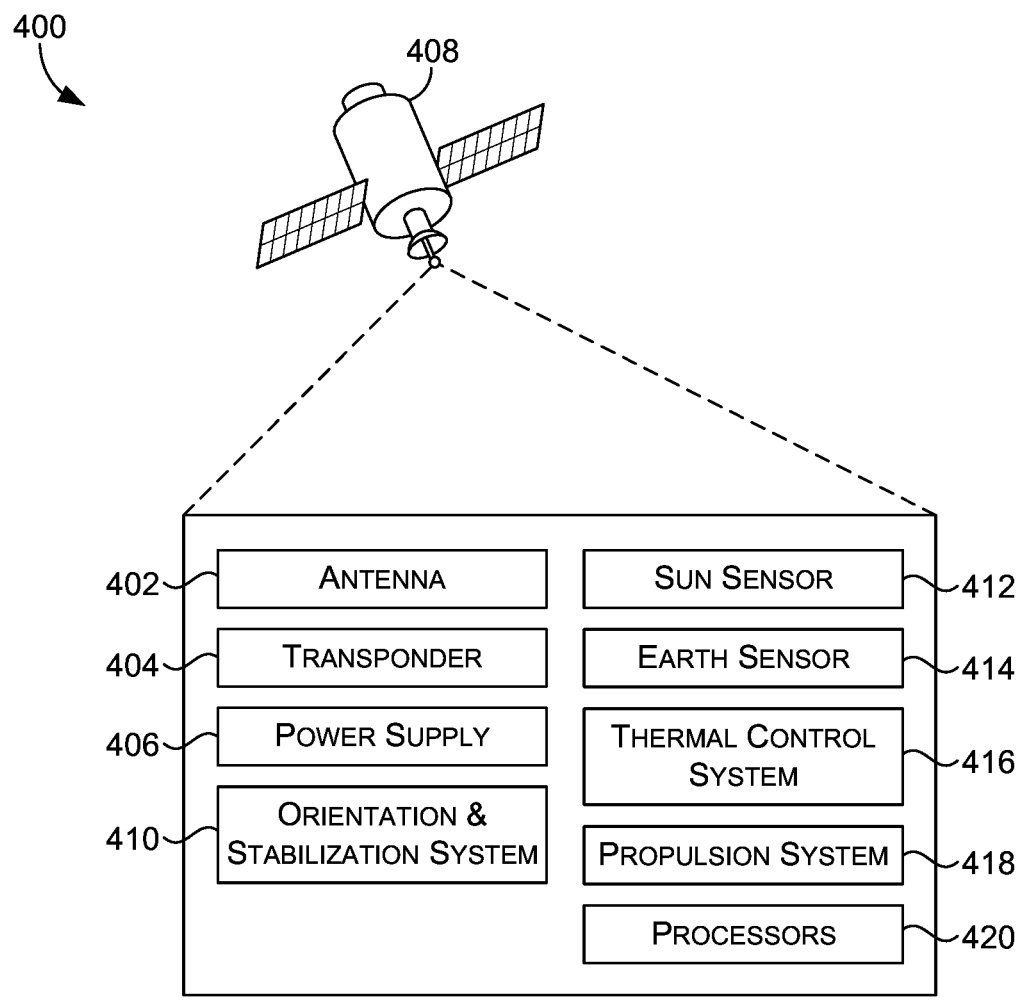
FIG. 4 depicts another example system, in accordance with one or more embodiments.

FIG. 4 provides a diagram of an example aerospace access point 400 and/or system for use in implementations of the present disclosure. The aerospace access point 400, such as a satellite, may include an antenna 402, a transponder 404, a power supply 406, and a housing 408, in aspects. The aerospace access point 400 can further include one or more of an orientation and stabilization system 410, a sun sensor 412, an Earth sensor 414, a thermal control system 416, a propulsion system 418, one or more processors 520, or any combination thereof.

The antenna 402, as previously described herein, may comprise one or more antennas. For example, the aerospace access point 400 can include a command antenna and a communication antenna. As such, the aerospace access point 400 can utilize a command antenna when communicating for telemetry and tracking, while using the communication antenna to receive uplink and/or downlink communications from terrestrial devices, such as a user device, satellite dish, and/or base station.

The transponder 404 comprises hardware that operates as a transmitter-receiver system for processing and modifying radio frequencies based on receiving signals and/or transmitting signals using one or more antennas. In various aspects, the aerospace access point 400 may include a plurality of transponders. Transponders can include subcomponents, for example, such as a duplexer, noise amplifiers (e.g., low noise amplifier), processors (e.g., carrier processors), power amplifiers, filters, frequency converters, oscillators, modulators, and/or any combination or quantity thereof.

The power supply 406 operates to provide power to the aerospace access point 400 and the aerospace access point components. The power supply 406 can include one or more components for capturing, storing, releasing, and/or controlling the flow of power to provide power for the operations of the aerospace access point components. Examples of a power supply include a battery or a solar panel or array.

The housing 408 is a physical structure that encloses or physically protects components of the aerospace access point 400. A solar array and/or antennas may be positioned outside or may be attached to a housing, whereas processors and thermal control systems may be housed within the housing 408.

The orientation and stabilization system 410 is configured to stabilize the aerospace access point 400, such as spin stabilization and/or three-axis (e.g., yaw axis, roll axis, and pitch axis) stabilization. The orientation and stabilization system 410 can include or utilize the sun sensor 412 and/or the Earth sensor 414 in various aspects. The orientation and stabilization system 410 can also communicate with and provide instructions to the propulsion system 418 in order to modify the positon and orientation of the aerospace access point 400, or specific components, such as a solar array or antenna(s). For example, the orientation and stabilization system 410 can, via sensors, detect spin or rotation and utilize the propulsion system 418 (e.g., thrusters) to modify or control the speed of rotation (e.g., the speed by which the aerospace access point 400 is spinning around its own central, vertical axis) in order to stabilize the aerospace access point 400. The orientation and stabilization system 410 can include one or more momentum wheels or reaction wheels, driven by motors, and which are mounted on three perpendicular axes (e.g., yaw axis, roll axis, and pitch axis).

The sun sensor 412 is a navigational sensor configured to detect the direction and position of the sun, and to determine the orientation of the aerospace access point with respect to the sun. The sun sensor 412 can further be configured to provide positional information and data that can be used to align a power supply system component, such as a solar array, to capture light. The Earth sensor 414 is a navigational sensor configured to detect the direction and position of the Earth (e.g., detection of light at or near the Earth's horizon when in orbit), and to determine orientation of the aerospace access point 400 with respect to the Earth. The Earth sensor 414 can provide positional information and data that can be used to determine orientation to the Earth's edge, for example, which may be used to determine roll angle and pitch.

The thermal control system 416 regulates and/or maintains optimized temperatures that ensure proper functioning of the aerospace access point 400 and the aerospace access point components. Examples of thermal control systems include thermoelectric coolers, heaters, fluid loop systems, and the like.

The propulsion system 418 operates to modify the position, orientation, pitch, and/or angle of the aerospace access point 400 and any components located on the exterior of the housing 408 of the aerospace access point 400, when the aerospace access point 400 is in orbit. The propulsion system 418 can be an "in-space" propulsion system that can rely on and utilize chemical propulsion, electric propulsion, and/or propellant-less propulsion. The propulsion system 418 can include, for example, thrusters, jets, solar sails, electrodynamic tethers, aerodynamic drag devices, monopropellant systems, bipropellant systems, hybrid propellants, cold/warm gas propellants, liquid propellants, solid propellants, electrothermal propulsion, electrospray propulsion, gridded ion propulsion, Hall-effect propulsion, pulsed plasma propulsion, vacuum arc propulsion, ambipolar propulsion, and any combination thereof. The propulsion system 418 may be controlled by processors and/or can work in tandem with or as a subsystem of the orientation and stabilization system 410, in various aspects.

The one or more processors of the aerospace access point 400 can be utilized by and can support any or all of the components and subsystems discussed above, and can perform any and all aspects described with regard to the method 300 of FIG. 3.

Figure 5:
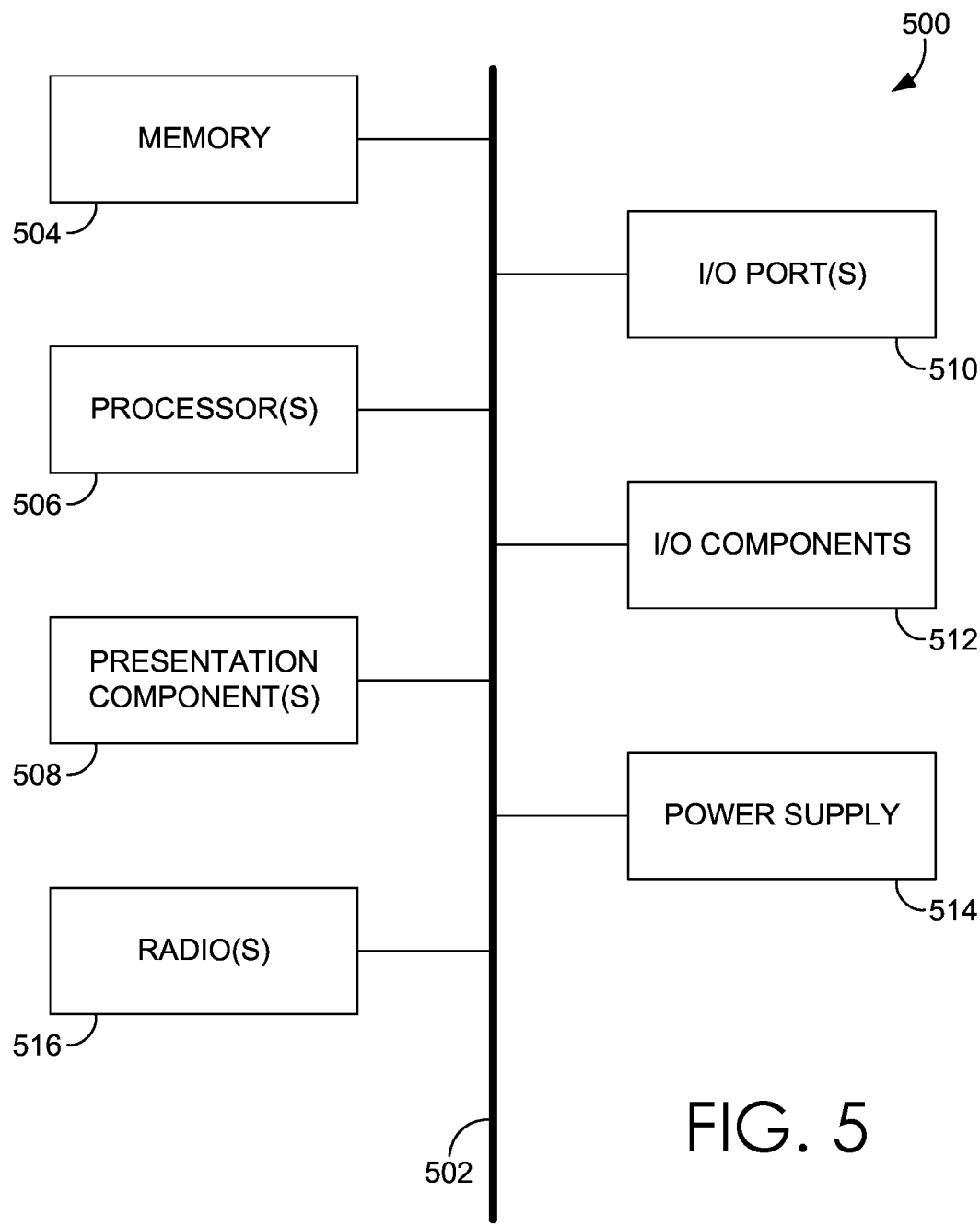
FIG. 5 illustrates an example computing device suitable for use in implementations of the present disclosure.

Turning now to FIG. 5, a diagram is depicted of another example computing device suitable for use in implementations of the present disclosure. Computing device 500 is but one example of a suitable computing environment and is not intended to suggest any limitation as to the scope of use or functionality of the invention, and nor should computing device 500 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples with the following devices: memory 504, one or more processors 506, one or more presentation components 508, input/output (I/O) ports 510, I/O components 512, and power supply 514. Bus 502 represents what may be one or more buses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 504 includes computer storage media in the form of volatile and/or non-volatile memory. Memory 504 may be removable, non-removable, or a combination thereof. Examples of memory include solid-state memory, hard drives, optical disc drives, etc. Computing device 500 includes one or more processors 506, which read data from various entities such as bus 502, memory 504, or I/O components 512. One or more presentation components 508 present data indications to a person or other device. Examples of one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various aspects the radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
receiving an indication that a user device sent a request to access a satellite network, wherein the indication is associated with a unique identifier for the user device, location coordinates of the user device, and a timestamp;
determining that the user device is located within a predefined geofence based on the location coordinates of the user device;
based on determining that the user device is located within the predefined geofence, querying a database with the unique identifier for the user device to determine whether the unique identifier is associated with one or more previously captured events on a terrestrial network within the predefined geofence, wherein the one or more previously captured events are associated with corresponding timestamps;
when the unique identifier is determined to be associated with the one or more previously captured events, identifying one of the one or more previously captured events that is associated with a most recent timestamp relative to any other previously captured events that are associated with the unique identifier;
determining a total time duration measured between the most recent timestamp and the timestamp of the indication; and
when the total time duration measured between the most recent timestamp and the timestamp of the indication is less than or equal to a predefined threshold:
determining that the request to access the satellite network from the user device should be rejected; and
generating and communicating an error to the satellite network, wherein the error causes the satellite network to reject the request from the user device to access the satellite network.

2. The method of claim 1 further comprising, when the total time duration measured between the most recent timestamp and the timestamp of the indication is greater than the predefined threshold:
determining that the request to access the satellite network from the user device should be accepted.

3. The method of claim 2 further comprising, when the total time duration measured between the most recent timestamp and the timestamp of the indication is greater than the predefined threshold:
generating and communicating a notification to the satellite network, wherein the notification causes the satellite network to allow the request from the user device to access the satellite network.

4. The method of claim 1 further comprising, identifying and selecting the predefined geofence from a plurality of predefined geofences in the terrestrial network based on geographic proximity to the location coordinates of the user device.

5. The method of claim 1 further comprising, recognizing that the user device sent the request to access the satellite network when the indication is associated with a particular signaling protocol.

6. The method of claim 1, wherein the predefined threshold defines a configurable time duration that is specific to the predefined geofence, a device type of the user device, a service tier for an account that corresponds to the user device, or a combination thereof.

7. The method of claim 1, wherein when the unique identifier is determined to not be associated with at least one of the one or more previously captured events stored in the database:
determining that the request to access the satellite network from the user device should be allowed.

8. One or more non-transitory computer-readable media storing instructions that when executed via one or more processors perform a computerized method, the media comprising:
receiving an indication that a user device sent a request to access a satellite network, wherein the indication is associated with a unique identifier for the user device, location coordinates of the user device, and a timestamp;
determining that the user device is located within a predefined geofence based on the location coordinates of the user device;
based on determining that the user device is located within the predefined geofence, querying a database with the unique identifier for the user device to determine whether the unique identifier is associated with one or more previously captured events on a terrestrial network within the predefined geofence, wherein the one or more previously captured events are associated with corresponding timestamps;

when the unique identifier is determined to be associated with the one or more previously captured events, identifying one of the one or more previously captured events that is associated with a most recent timestamp relative to any other previously captured events that are associated with the unique identifier;

determining a total time duration measured between the most recent timestamp and the timestamp of the indication; and when the total time duration measured between the most recent timestamp and the timestamp of the indication is less than or equal to a predefined threshold:
   determining that the request to access the satellite network from the user device should be rejected; and
   generating and communicating an error to the satellite network, wherein the error causes the satellite network to reject the request from the user device to access the satellite network.

9. The media of claim 8 further comprising, when the total time duration measured between the most recent timestamp and the timestamp of the indication is greater than the predefined threshold:
   determining that the request to access the satellite network from the user device should be accepted.

10. The media of claim 9 further comprising, when the total time duration measured between the most recent timestamp and the timestamp of the indication is greater than the predefined threshold:
   generating and communicating a notification to the satellite network, wherein the notification causes the satellite network to allow the request from the user device to access the satellite network.

11. The media of claim 8 further comprising, identifying and selecting the predefined geofence from a plurality of predefined geofences in the terrestrial network based on geographic proximity to the location coordinates of the user device.

12. The media of claim 8 further comprising, recognizing that the user device sent the request to access the satellite network when the indication is associated with a particular signaling protocol.

13. The media of claim 8, wherein the predefined threshold defines a configurable time duration that is specific to the predefined geofence, a device type of the user device, a service tier for an account that corresponds to the user device, or a combination thereof.

14. The media of claim 8, wherein when the unique identifier is determined to not be associated with at least one of the one or more previously captured events stored in the database:
   determining that the request to access the satellite network from the user device should be allowed.

15. A system comprising:
   a database storing and updating events for a plurality of user devices, wherein each event corresponds to a unique identifier that is specific to a particular user device, wherein each event is associated with a location for the particular user device, wherein each event is associated with a timestamp; and
   a server having one or more processors, wherein the server operates within a terrestrial network, wherein the one or more processors:
      receiving an indication that a user device sent a request to access a satellite network, wherein the indication is associated with the unique identifier for the user device, location coordinates of the user device, and the timestamp;
      determining that the user device is located within a predefined geofence based on the location coordinates of the user device;
      based on determining that the user device is located within the predefined geofence, querying the database with the unique identifier for the user device to determine whether the unique identifier is associated with one or more previously captured events on the terrestrial network within the predefined geofence, wherein the one or more previously captured events are associated with corresponding timestamps;
      when the unique identifier is determined to be associated with the one or more previously captured events, identifying one of the one or more previously captured events that is associated with a most recent timestamp relative to any other previously captured events that are associated with the unique identifier;
      determining a total time duration measured between the most recent timestamp and the timestamp of the indication; and
      when the total time duration measured between the most recent timestamp and the timestamp of the indication is less than or equal to a predefined threshold:
         determining that the request to access the satellite network from the user device should be rejected; and
         generating and communicating an error to the satellite network, wherein the error causes the satellite network to reject the request from the user device to access the satellite network.

16. The system of claim 15 further comprising, when the total time duration measured between the most recent timestamp and the timestamp of the indication is greater than the predefined threshold:
   determining that the request to access the satellite network from the user device should be accepted.

17. The system of claim 16 further comprising, when the total time duration measured between the most recent timestamp and the timestamp of the indication is greater than the predefined threshold:
   generating and communicating a notification to the satellite network, wherein the notification causes the satellite network to allow the request from the user device to access the satellite network.

18. The system of claim 15 further comprising, identifying and selecting the predefined geofence from a plurality of predefined geofences in the terrestrial network based on geographic proximity to the location coordinates of the user device.

19. The system of claim 15 further comprising, recognizing that the user device sent the request to access the satellite network when the indication is associated with a particular signaling protocol.

20. The system of claim 15, wherein the predefined threshold defines a configurable time duration that is specific to the predefined geofence, a device type of the user device, a service tier for an account that corresponds to the user device, or a combination thereof.

* * * * *